(12) United States Patent
Wu et al.

(10) Patent No.: US 10,586,662 B2
(45) Date of Patent: Mar. 10, 2020

(54) KEYBOARD DEVICE

(71) Applicant: Primax Electronics Ltd., Taipei (TW)

(72) Inventors: Ming-Han Wu, Taipei (TW); Che-Wei Yang, Taipei (TW); Yi-Wei Chen, Taipei (TW)

(73) Assignee: PRIMAX ELECTRONICS LTD, Taipei (TW)

( * ) Notice: Subject to any disclaimer, the term of this patent is extended or adjusted under 35 U.S.C. 154(b) by 0 days.

(21) Appl. No.: 16/017,129

(22) Filed: Jun. 25, 2018

(65) Prior Publication Data

US 2019/0287744 A1    Sep. 19, 2019

(30) Foreign Application Priority Data

Mar. 16, 2018    (TW) .............................. 107109117 A

(51) Int. Cl.
*G06F 3/02*     (2006.01)
*H01H 13/7065*  (2006.01)
*H01H 13/807*   (2006.01)

(52) U.S. Cl.
CPC ....... *H01H 13/7065* (2013.01); *G06F 3/0202* (2013.01); *H01H 13/807* (2013.01)

(58) Field of Classification Search
CPC .... G06F 3/0216; G06F 1/1664; G06F 1/1671; G06F 3/0202; G06F 3/02; H01H 3/125; H01H 2221/032; H01H 13/7065; H01H 13/807

See application file for complete search history.

(56) References Cited

U.S. PATENT DOCUMENTS

| | | | |
|---|---|---|---|
| 2016/0329166 A1* | 11/2016 | Hou | H01H 3/122 |
| 2017/0062151 A1* | 3/2017  | Iso | H01H 13/14 |
| 2017/0186569 A1* | 6/2017  | Hsu | H01H 13/52 |
| 2019/0096604 A1* | 3/2019  | Yen | H01H 13/705 |

* cited by examiner

*Primary Examiner* — Lunyi Lao
*Assistant Examiner* — Jarurat Suteerawongsa
(74) *Attorney, Agent, or Firm* — Kirton McConkie; Evan R. Witt

(57) ABSTRACT

A keyboard device includes a key, a base plate, a membrane circuit board and a buffering part. The membrane circuit board is disposed on the base plate. The key includes a keycap and a stabilizer bar. The stabilizer bar is connected between the keycap and the base plate. The stabilizer bar includes a main bar part, a first linking part and a first insertion part. The first linking part is connected between the main bar part and the first insertion part. The buffering part is disposed on the base plate or the membrane circuit board and located under the first linking part. While a keycap is moved downwardly relative to the base plate, the linking part of the stabilizer bar is contacted with the buffering part. The contact point between the linking part of the stabilizer bar and the buffering part is used as a fulcrum.

12 Claims, 12 Drawing Sheets

KEYBOARD DEVICE

FIELD OF THE INVENTION

The present invention relates to an input device, and more particularly to a keyboard device.

BACKGROUND OF THE INVENTION

Generally, the widely-used peripheral input device of a computer system includes for example a mouse device, a keyboard device, a trackball device, or the like. Via the keyboard device, characters or symbols can be inputted into the computer system directly. As a consequence, most users and most manufacturers of input devices pay much attention to the development of keyboard devices.

The structures and the functions of a conventional keyboard device 1 will be illustrated as follows. Please refer to FIGS. 1, 2 and 3. FIG. 1 is a schematic top view illustrating the outer appearance of a conventional keyboard device. FIG. 2 is a schematic exploded view illustrating a portion of the keyboard device of FIG. 1 and taken along a viewpoint. FIG. 3 is a schematic exploded view illustrating a portion of the keyboard device of FIG. 1 and taken along another viewpoint. For succinctness, only one key 10' and the related components are shown in FIGS. 2 and 3.

The conventional keyboard device 1 comprises plural keys 10 and 10', a base plate 11 and a membrane circuit board 12. The membrane circuit board 12 comprises plural membrane switches 121 corresponding to the plural keys 10 and 10'. Each of the plural keys 10 and 10' comprises a keycap 101, at least one scissors-type connecting element 102 and an elastic element 103. The keycap 101 comprises a covering body 1016 and a skirt part 1017. The skirt part 1017 is connected with an edge of the covering body 1016 and protruded downwardly. The scissors-type connecting element 102 is connected between a bottom surface of the covering body 1016 of the keycap 101 and the base plate 11. Moreover, the scissors-type connecting element 102 comprises a first frame 1021 and a second frame 1022. The second frame 1022 is pivotally coupled to the first frame 1021. Consequently, the first frame 1021 and the second frame 1022 can be swung relative to each other. The elastic element 103 is arranged between the keycap 101 and the base plate 11. Moreover, the elastic element 103 comprises a contacting part 1031.

While the keycap 101 of any key 10 or 10' is depressed and moved downwardly relative to the base plate 11, the first frame 1021 and the second frame 1022 of the scissors-type connecting element 102 are switched from an open-scissors state to a stacked state. Moreover, as the keycap 101 is moved downwardly to compress the elastic element 103, the corresponding membrane switch 121 is pushed and triggered by the contacting part 1031 of the elastic element 103. Consequently, the keyboard device 1 generates a corresponding key signal. When the keycap 101 of the key 10 or 10' is no longer depressed, the keycap 101 is moved upwardly relative to the base plate 11 in response to an elastic force of the elastic element 103. Meanwhile, the first frame 1021 and the second frame 1022 are switched from the stacked state to the open-scissors state again, and the keycap 101 is returned to its original position.

As shown in the drawings, the length L1 of the key 10' is much larger than the width W1 of the key 10'. The key 10' further comprises two stabilizer bars 104. Each first stabilizer bar 104 comprises a main bar part 1041 and two hook parts 1042. The two hook parts 1042 are located at two ends of the main bar part 1041, respectively.

The base plate 11 comprises a first connecting structure 111 and a second connecting structure 112. The first connecting structure 111 and the second connecting structure 112 are protruded upwardly from the base plate 12, and penetrated through the membrane circuit board 12. The first connecting structure 111 comprises two first locking holes 1111. The second connecting structure 112 comprises two second locking holes 1121 corresponding to the two first locking holes 1111. The main bar part 1041 of the each stabilizer bar 104 is pivotally coupled to the keycap 101 of the key 10'. The two hook parts 1042 of each stabilizer bar 104 are penetrated through the corresponding first locking hole 1111 of the first connecting structure 111 and the corresponding second locking hole 1121 of the second connecting structure 112, respectively.

FIG. 4 schematically illustrates the actions of the stabilizer bars of the keyboard device as shown in FIG. 1. While the keycap 101 of the key 10' is moved upwardly or downwardly relative to the base plate 11, the stabilizer bars 104 are moved in the direction D11 or the direction D12 and rotated in the direction D13 or the direction D14. By this design, the key 10' is kept stable and not inclined while the key 10' is moved upwardly or downwardly relative to the base plate 11. Moreover, this design is helpful to increase the strength of the keycap 101.

However, the conventional keyboard device 1 still has some drawbacks. While the keycap 101 of any key 10 or 10' is depressed and downwardly relative to the base plate 11, the main bar parts 1041 of the stabilizer bars 104 collide with the base plate 11 or the membrane circuit board 12 to generate a sound. Generally, the sound is unpleasant noise to the user. For solving the above drawbacks, a keyboard device with a buffering part has been disclosed.

FIG. 5 is a schematic perspective view illustrating the stabilizer bars, the base plate and the membrane circuit board of a conventional keyboard device with a buffering part. In comparison with the keyboard device 1 of FIG. 4, the keyboard device 1A of FIG. 5 further comprises strip-like elastic vibration absorbers 13. The elastic vibration absorbers 13 are aligned with the whole main bar parts 1041 of the stabilizer bars 104 and disposed on the base plate 11 or the membrane circuit board 12. While the keycap 101 of any key 10 or 10' is depressed and downwardly relative to the base plate 11, the main bar parts 1041 of the stabilizer bars 104 directly collide with the elastic vibration absorbers 13. Consequently, the sound resulted from the collision between the main bar parts 1041 and the base plate 11 or the membrane circuit board 12 is reduced.

However, the conventional keyboard devices 1 and 1A still have some drawbacks. Please refer to FIGS. 2 and 3 again. For the keyboard device 1 or 1A, the skirt part 1017 of the keycap 101 has a height H. While the keycap 101 of any key 10 or 10' is depressed and downwardly relative to the base plate 11, the skirt part 1017 of the keycap 101 also collides with the base plate 11 or the membrane circuit board 12 to generate a sound. Generally, the sound is unpleasant noise to the user.

In other words, the conventional keyboard devices 1 and 1A need to be further improved.

SUMMARY OF THE INVENTION

An object of the present invention provides a keyboard device having a function of reducing noise. A buffering part corresponding to a stabilizer bar is disposed on a base plate or a membrane circuit board. While a keycap is moved downwardly relative to the base plate, a linking part of the stabilizer bar is contacted with the buffering part. The contact point between the linking part of the stabilizer bar and the buffering part is used as a fulcrum. Since the base plate or the membrane circuit board is not directly collided by the main bar part of the stabilizer bar and a skirt part of the keycap, the unpleasing sound is not generated.

In accordance with an aspect of the present invention, there is provided a keyboard device. The keyboard device includes a key, a base plate, a membrane circuit board and a buffering part. The key includes a keycap and a stabilizer bar. The stabilizer bar includes a main bar part, a first linking part and a first insertion part. The main bar part is pivotally coupled to the keycap. A first end of the first linking part is connected with a first end of the main bar part. A second end of the first linking part is connected with a first end of the first insertion part. A junction between the first end of the first linking part and the first end of the main bar part is a first bent structure. A junction between the second end of the first linking part and the first end of the first insertion part is a second bent structure. The key is connected with the base plate, and a first connecting structure is protruded upwardly from the base plate. The first connecting structure has a first locking hole. A second end of the first insertion part of the stabilizer bar is penetrated through the first locking hole. The membrane circuit board is disposed on the base plate, and includes a membrane switch corresponding to the key. The buffering part is disposed on the base plate or the membrane circuit board and located under the first linking part. While the keycap depressed and the first linking part is correspondingly moved downwardly, the first linking part is contacted with the buffering part at a first contact point between the first linking part and the buffering part. There is a first vertical distance between the contact point and the first end of the first linking part, there is a second vertical distance between the contact point and the second end of the first linking part, and the first vertical distance is larger than the second vertical distance.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
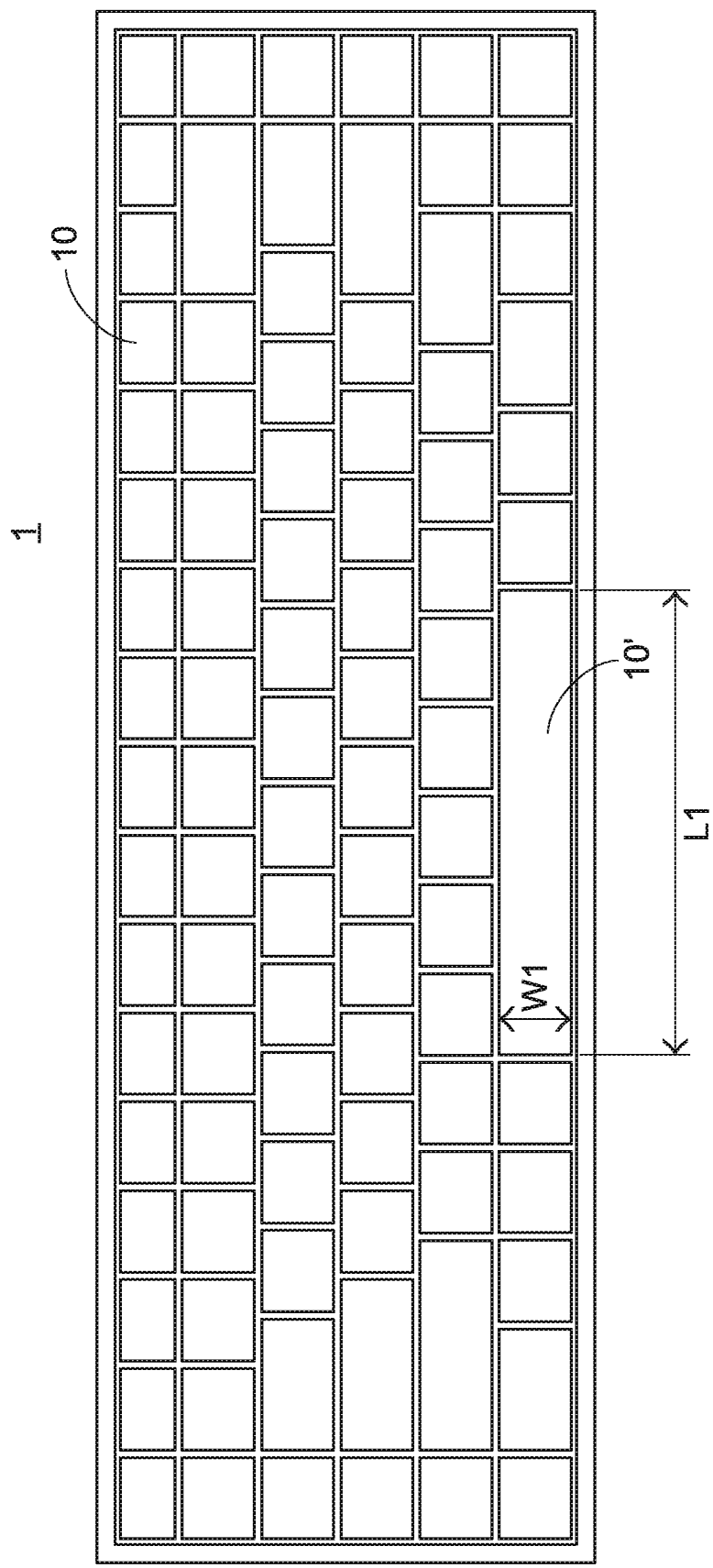
FIG. 1 is a schematic top view illustrating the outer appearance of a conventional keyboard device.
Figure 2:
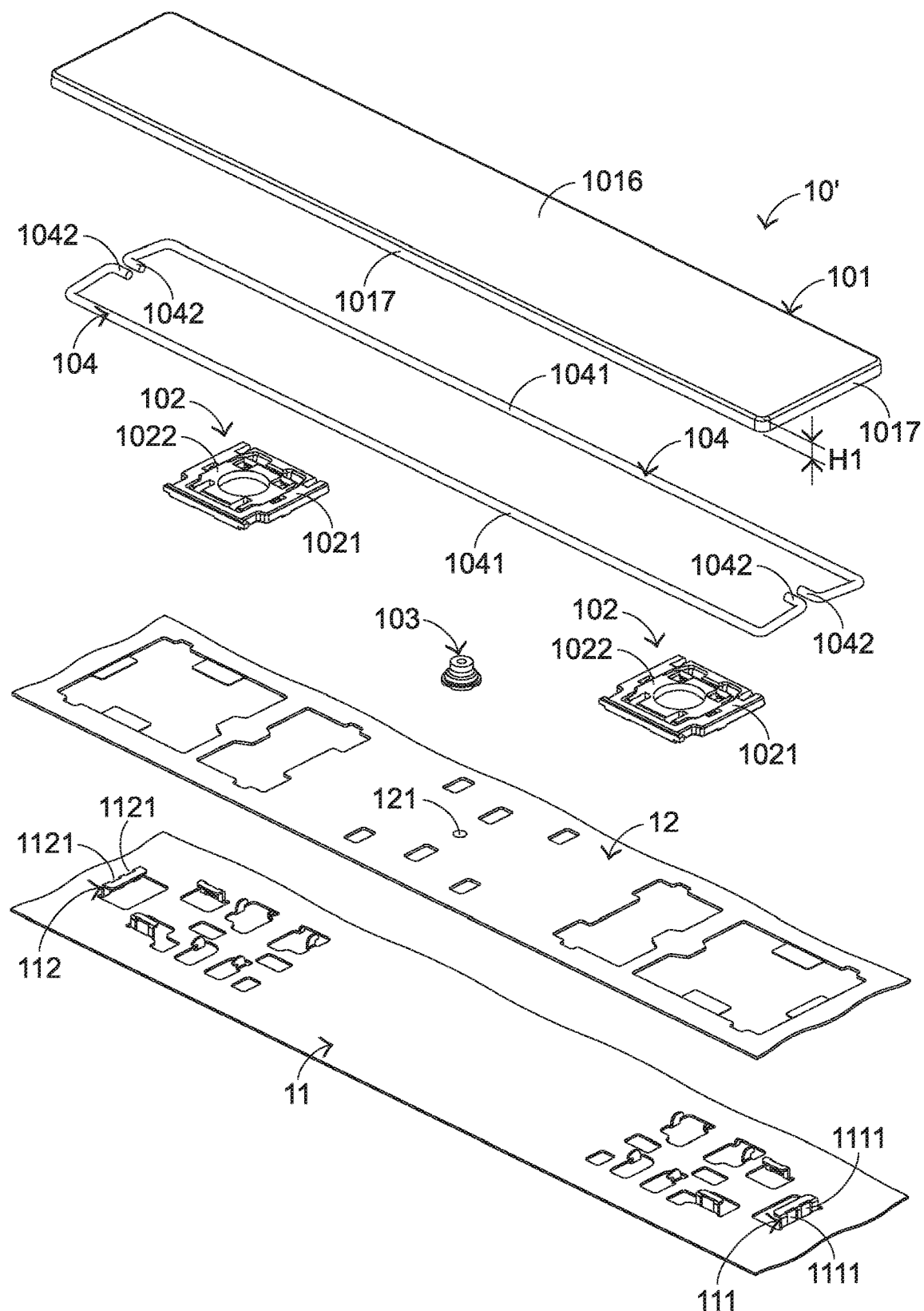
FIG. 2 is a schematic exploded view illustrating a portion of the keyboard device of FIG. 1 and taken along a viewpoint.
Figure 3:
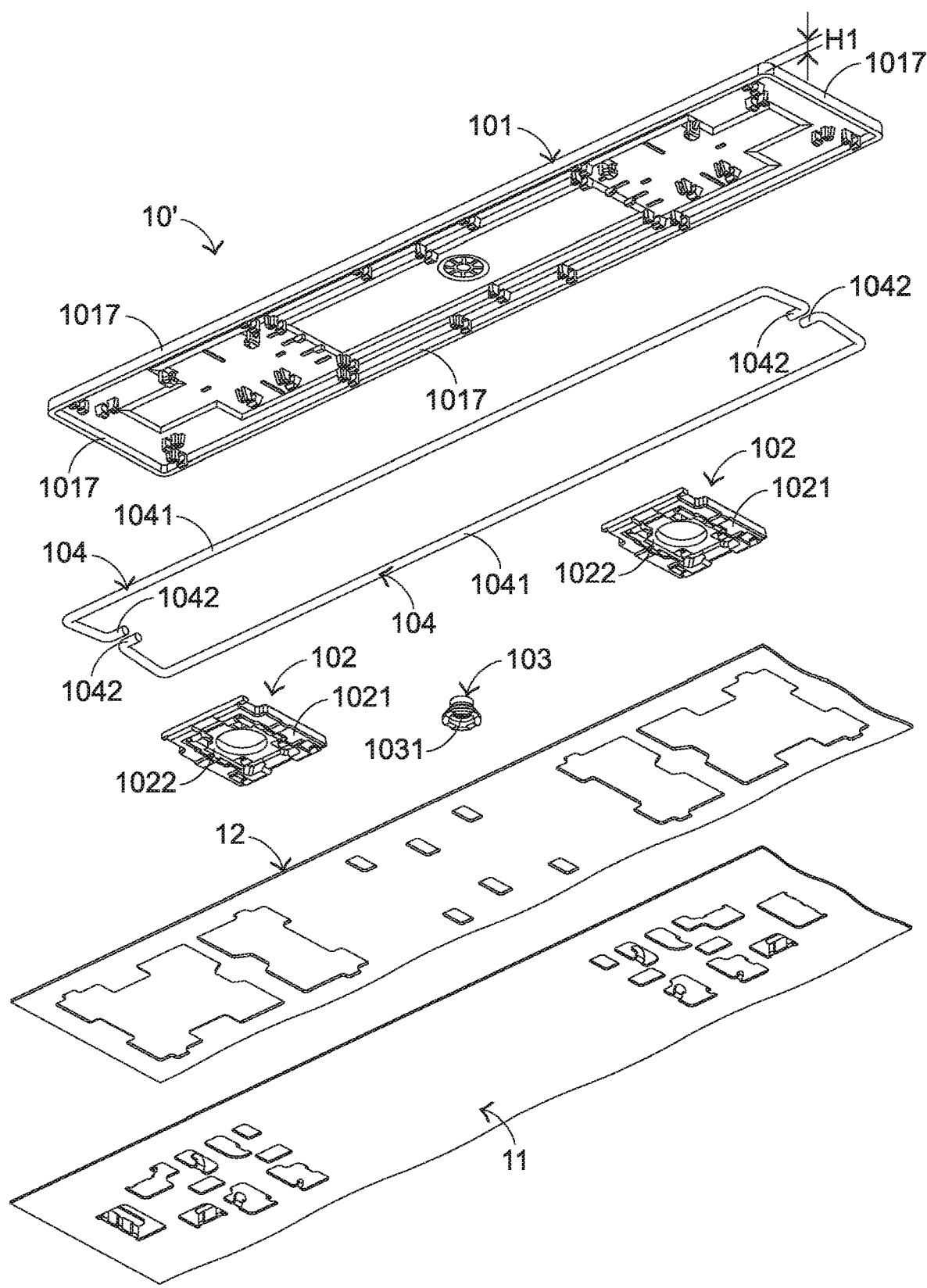
FIG. 3 is a schematic exploded view illustrating a portion of the keyboard device of FIG. 1 and taken along another viewpoint.
Figure 4:
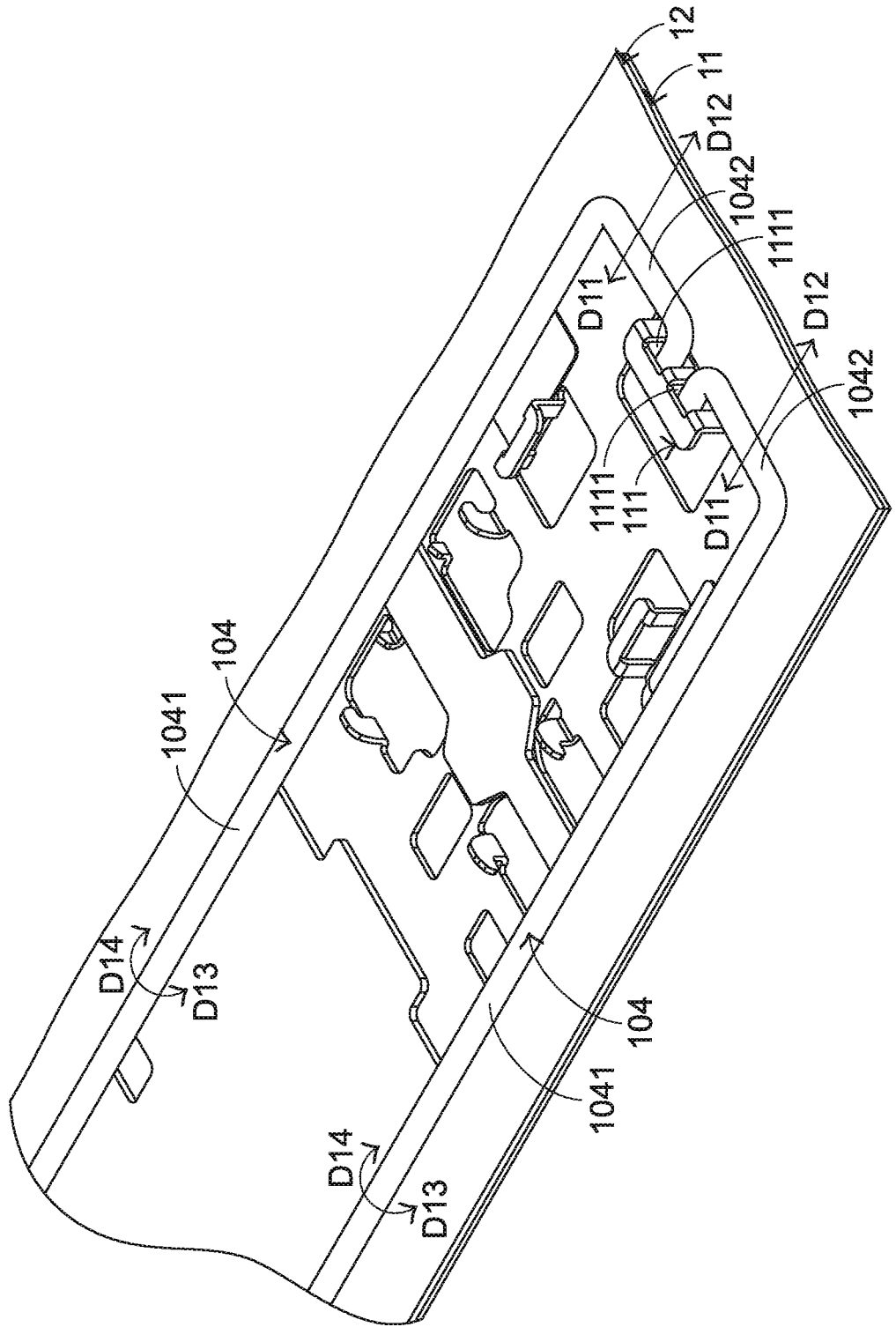
FIG. 4 schematically illustrates the actions of the stabilizer bars of the keyboard device as shown in FIG. 1.
Figure 5:
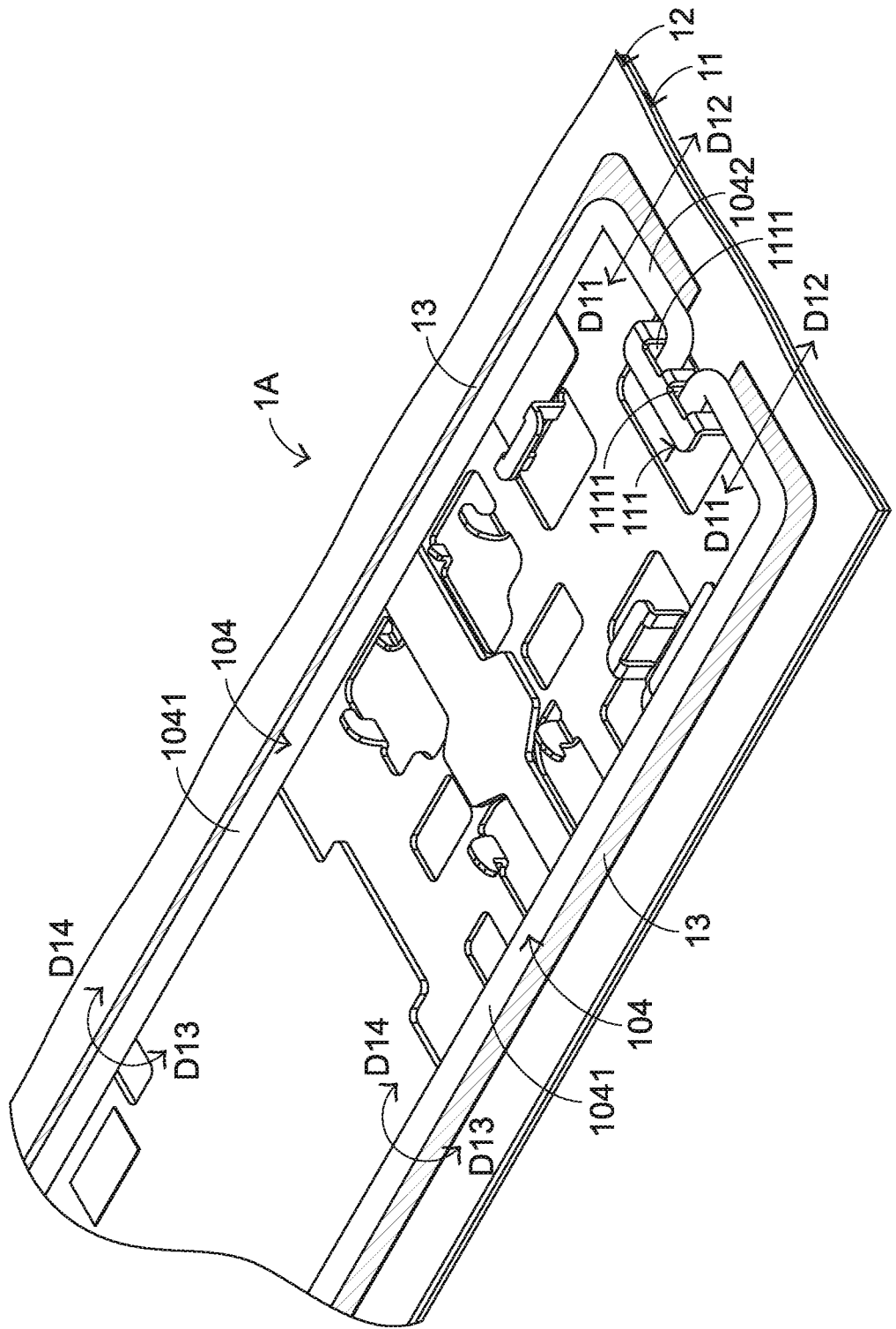
FIG. 5 is a schematic perspective view illustrating the stabilizer bars, the base plate and the membrane circuit board of a conventional keyboard device with a buffering part.
Figure 6:
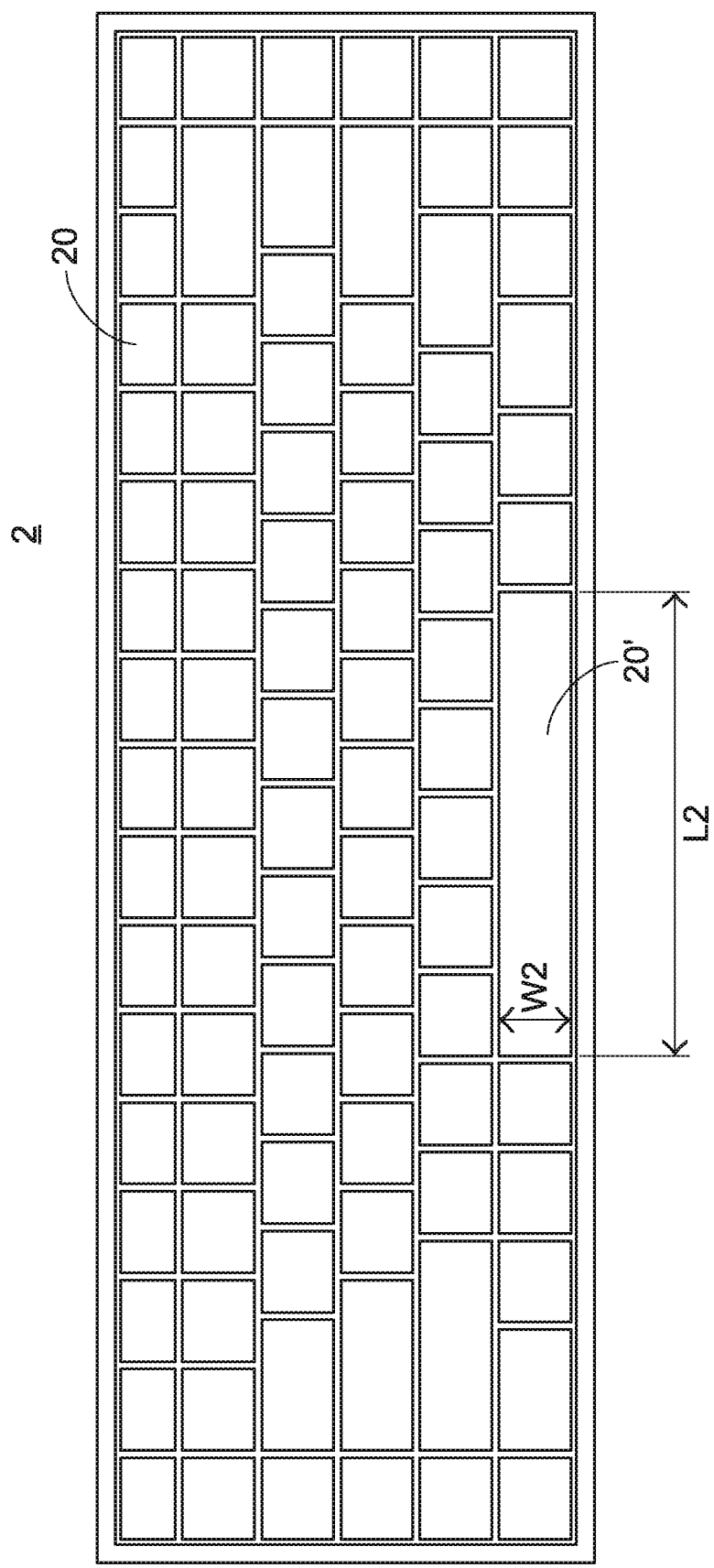
FIG. 6 is a schematic top view illustrating the outer appearance of a keyboard device according to an embodiment of the present invention.
Figure 7:
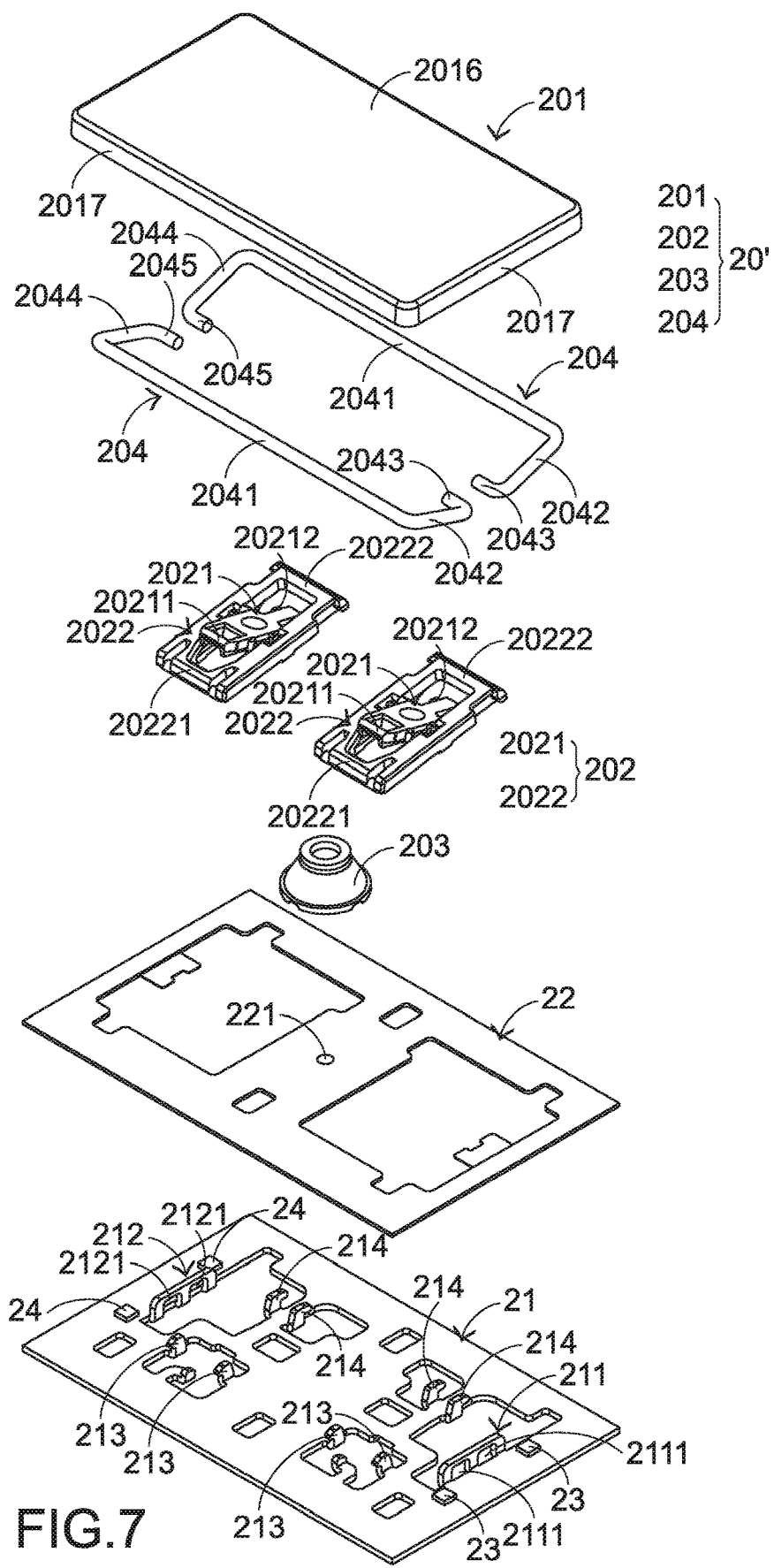
FIG. 7 is a schematic exploded view illustrating a portion of the keyboard device of FIG. 6 and taken along a viewpoint.
Figure 8:
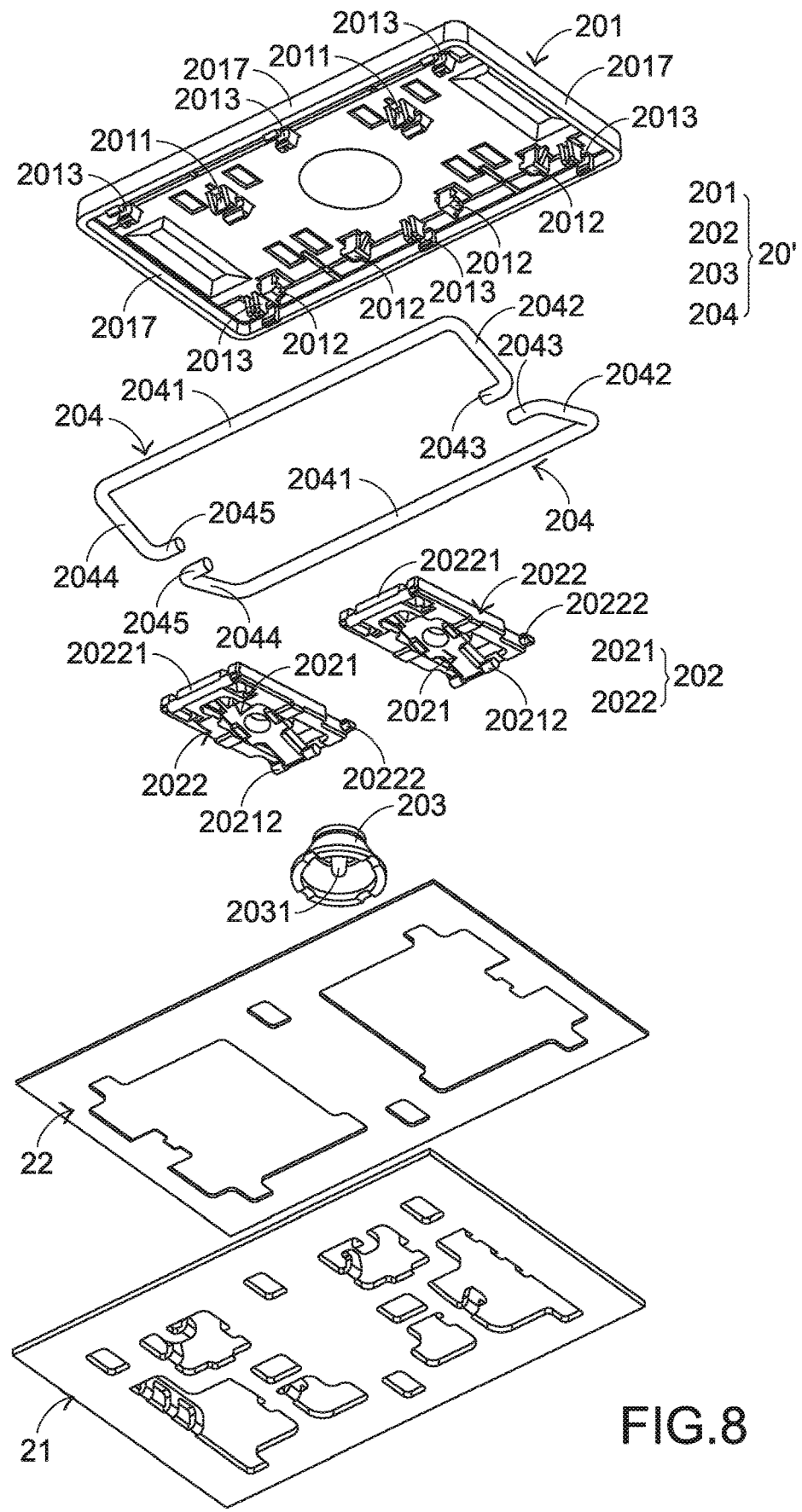
FIG. 8 is a schematic exploded view illustrating a portion of the keyboard device of FIG. 6 and taken along another viewpoint.

Please refer to FIGS. 6, 7 and 8. FIG. 6 is a schematic top view illustrating the outer appearance of a keyboard device according to an embodiment of the present invention. FIG. 7 is a schematic exploded view illustrating a portion of the keyboard device of FIG. 6 and taken along a viewpoint. FIG. 8 is a schematic exploded view illustrating a portion of the keyboard device of FIG. 6 and taken along another viewpoint. For succinctness, only one key 20' and the related components are shown in FIGS. 7 and 8.

The keyboard device 2 comprises plural keys 20 and 20', a base plate 21 and a membrane circuit board 22. The membrane circuit board 22 is arranged between the plural keys 20, 20' and the base plate 21. These keys 20 and 20' are classified into some types, e.g., ordinary keys, numeric keys and function keys. When one of the keys 20 and 20' is depressed by the user's finger, the keyboard device 2 generates a corresponding key signal to a computer (not shown), and thus the computer executes a function corresponding to the depressed key. For example, when an ordinary key is depressed, a corresponding English letter or symbol is inputted into the computer. When a numeric key is depressed, a corresponding number is inputted into the computer. In addition, the function keys (F1~F12) can be programmed to provide various quick access functions.

Figure 9:
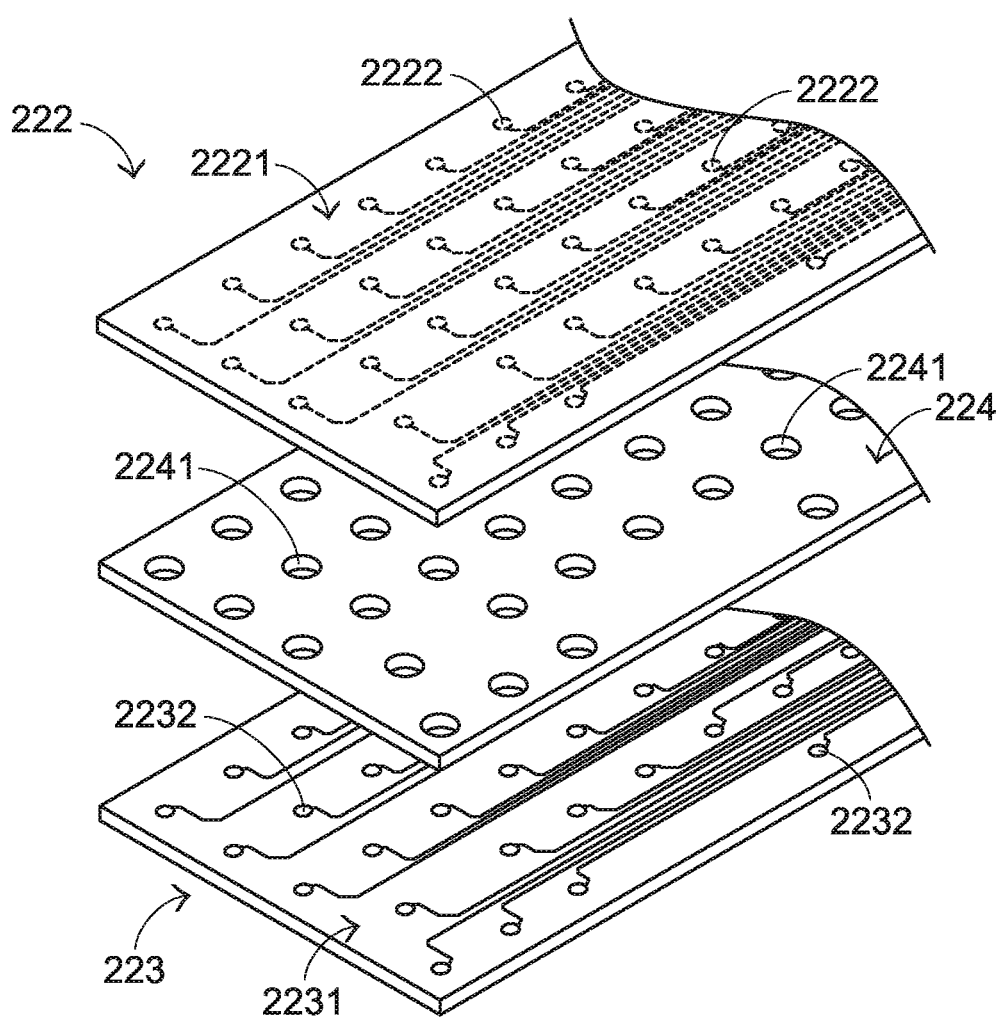
FIG. 9 is a schematic exploded view illustrating the membrane circuit board of the keyboard device as shown in FIG. 6.

FIG. 9 is a schematic exploded view illustrating the membrane circuit board of the keyboard device as shown in FIG. 6. In this embodiment, the membrane circuit board 22 comprises an upper film layer 222 and a lower film layer 223. A first circuit pattern 2221 is formed on a bottom surface of the upper film layer 222. The first circuit pattern 2221 comprises plural upper contacts 2222 corresponding to the plural keys 20 and 20'. A second circuit pattern 2231 is formed on a top surface of the lower film layer 223. The second circuit pattern 2231 comprises plural lower contacts 2232 corresponding to the plural upper contacts 2222. Each of the upper contacts 2222 and the corresponding lower contact 2232 are separated from each other by a spacing interval. Moreover, each of the upper contacts 2222 and the corresponding lower contact 2232 are collectively defined as a membrane switch 221. Moreover, for maintaining the spacing interval between each upper contact 2222 and the corresponding lower contact 2232, the membrane circuit board 22 further comprises an intermediate film layer 224. The intermediate film layer 224 is arranged between the upper film layer 222 and the lower film layer 223. In addition, the intermediate film layer 224 comprises plural perforations 2241 corresponding to the plural upper contacts 2222 and the plural lower contacts 2232. Preferably but not exclusively, at least one of the upper film layer 222, the lower film layer 223 and the intermediate film layer 224 is made of polycarbonate (PC), polyethylene terephthalate (PET), polymethylmethacrylate (PMMA), polyurethane (PU) or polyimide (PI).

Each of the plural keys 20 and 20' comprises a keycap 201, at least one connecting element 202 and an elastic element 203. The keycap 201 comprises a covering body 2016 and a skirt part 2017. The skirt part 2017 is connected with an edge of the covering body 2016 and protruded downwardly. The connecting element 202 is connected between the keycap 201 and the base plate 21. Through the connecting element 202, the keycap 201 is movable upwardly or downwardly relative to the base plate 21. The elastic element 203 is arranged between the keycap 201 and the base plate 21. Moreover, the elastic element 203 comprises a contacting part 2031.

In an embodiment, the keycap 201 comprises fixed hooks 2011 and movable hooks 2012. The fixed hooks 2011 and the movable hooks 2012 are disposed on a bottom surface of the covering body 2016 of the keycap 201.

In an embodiment, the connecting element 202 is a scissors-type connecting element. Moreover, the connecting element 22 comprises a first frame 2021 and a second frame 2022. The second frame 2022 is pivotally coupled to the first frame 2021. The first frame 2021 is an inner frame, and the second frame 2022 is an outer frame. The base plate 21 comprises plural first base plate hooks 213 and plural second base plate hooks 214. The plural first base plate hooks 213 and the plural second base plate hooks 214 are protruded upwardly and penetrated through the membrane circuit board 22. The first end 20211 of the first frame 2021 is connected with the corresponding fixed hook 2011 of the keycap 201. The second end 20212 of the first frame 2021 is connected with the second base plate hook 214 of the base plate 21. The first end 20221 of the second frame 2022 is connected with the corresponding first base plate hook 2 of the base plate 21. The second end 20222 of the second frame 2022 is connected with the movable hook 2012 of the keycap 201. Due to the above structure, the first frame 2021 and the second frame 2022 can be swung relative to each other. Consequently, the first frame 2021 and the second frame 2022 are switched from a stacked state to an open-scissors state or switched from the open-scissors state to the stacked state. The connecting relationships between the connecting element 202, the base plate 21 and the keycap 201 are presented herein for purpose of illustration and description only.

While the keycap 201 of any key 20 or 20' is depressed and moved downwardly relative to the base plate 21, the first frame 2021 and the second frame 2022 of the connecting element 202 are switched from the open-scissors state to the stacked state. Moreover, as the keycap 201 is moved downwardly to compress the elastic element 203, the corresponding upper contact 2222 is pushed and triggered by the contacting part 2031 of the elastic element 203. Consequently, the corresponding upper contact 2222 is contacted with the corresponding lower contact 2232 through the corresponding perforation 2241. In such way, the corresponding membrane switch 221 is electrically conducted, and the keyboard device 2 generates a corresponding key signal. When the keycap 201 of the key 20 or 20' is no longer depressed, the keycap 201 is moved upwardly relative to the base plate 21 in response to an elastic force of the elastic element 203. Meanwhile, the first frame 2021 and the second frame 2022 are switched from the stacked state to the open-scissors state. Consequently, the keycap 201 is returned to its original position.

Please refer to FIGS. 6, 7 and 8 again. The length L2 of the key 20' is much larger than the width W2 of the key 20'. The key 20' further comprises two stabilizer bars 204. Each stabilizer bar 204 comprises a main bar part 2041, a first linking part 2042, a second linking part 2044, a first insertion part 2043 and a second insertion part 2045. The first end and the second end of the first linking part 2042 are connected with the first end of the main bar part 2041 and the first end of the first insertion part 2043, respectively. The junction between the first end of the first linking part 2042 and the first end of the main bar part 2041 is a bent structure. The junction between the second end of the first linking part 2042 and the first end of the first insertion part 2043 is also a bent structure. The first end and the second end of the second linking part 2044 are connected with the second end of the main bar part 2041 and the first end of the second insertion part 2045, respectively. The junction between the first end of the second linking part 2044 and the second end of the main bar part 2041 is a bent structure. The junction between the second end of the second linking part 2044 and the first end of the second insertion part 2045 is also a bent structure.

As mentioned above, the length L2 of the key 20' is much larger than the width W2 of the key 20'. The keycap 201 of the key 20' further comprises plural stabilizer lock parts 2013. The main bar parts 2041 of the stabilizer bars 204 are inserted into the corresponding stabilizer lock parts 2013 and pivotally coupled to the corresponding stabilizer lock parts 2013. The base plate 21 further comprises a first connecting structure 211 and a second connecting structure 212. The first connecting structure 211 and the second connecting structure 212 are protruded upwardly from the base plate 21, and penetrated through the membrane circuit board 22. The first connecting structure 211 comprises two first locking holes 2111. The second connecting structure 212 comprises two second locking holes 2121 corresponding to the two first locking holes 2111. The second ends of the first insertion part 2043 of the stabilizer bars 204 are penetrated through the two first locking holes 2111 of the first connecting structure 211, respectively. The second ends of the second insertion parts 2045 of the stabilizer bars 204 are penetrated through the two second locking holes 2121 of the second connecting structure 212, respectively.

After each stabilizer bar 204 is connected between the keycap 201 and the base plate 21, the main bar part 2041 of the stabilizer bar 204 is closer to an outer periphery of the keycap 201 than the first insertion part 2043 and the second insertion part 2045 of the stabilizer bar 204. In other words, the first end of the first linking part 2042 is closer to the outer periphery of the keycap 201 than the second end of the first linking part 2042, and the first end of the second linking part 2044 is closer to the outer periphery of the keycap 201 than the second end of the second linking part 2044.

Figure 10:
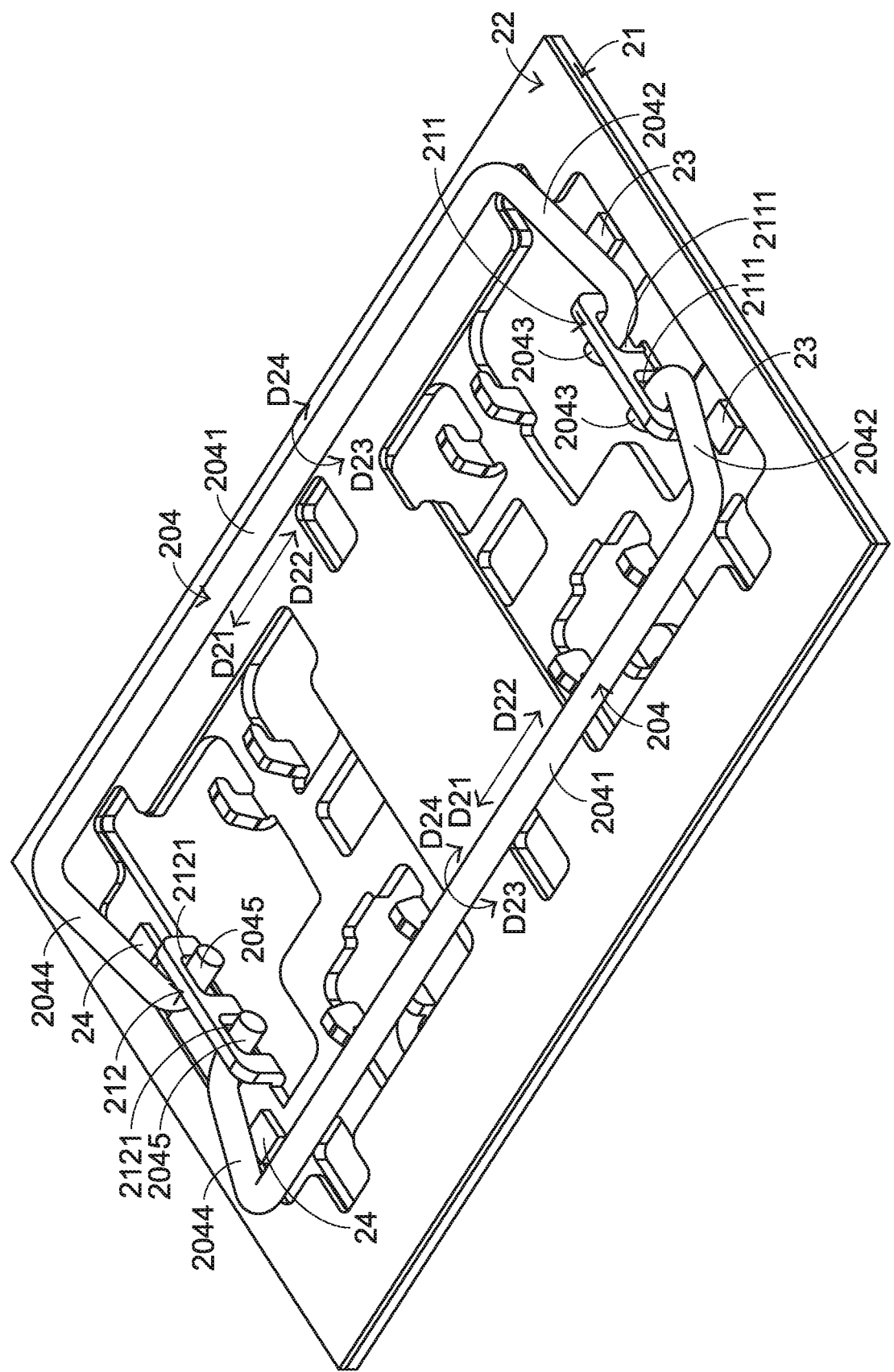
FIG. 10 schematically illustrates the actions of the stabilizer bar of the keyboard device as shown in FIG. 6.

FIG. 10 schematically illustrates the actions of the stabilizer bar of the keyboard device as shown in FIG. 6. For succinctness, only the stabilizer bars 204 and the related components are shown in FIG. 10. The keycap 201 and the connecting element 202 are not shown in FIG. 10. While the keycap 201 of the key 20' is moved upwardly or downwardly relative to the base plate 21, the stabilizer bars 204 are moved in the direction D21 or the direction D22 and rotated in the direction D23 or the direction D24. In addition, the main bar parts 2041 are rotated relative to the corresponding stabilizer lock parts 2013 of the keycap 201. Consequently, while the key 20' is moved upwardly or downwardly relative to the base plate 21, the key 20' is kept stable and not inclined. Moreover, this design is helpful to increase the strength of the keycap 201.

Please refer to FIGS. 7 and 10. The keyboard device 2 further comprises two first buffering parts 23 and two second buffering parts 24. The first buffering parts 23 and the second buffering parts 24 are disposed on the base plate 21. The first buffering parts 23 are located under the first linking parts 2042 of the corresponding stabilizer bars 204. The second buffering parts 24 are located under the second linking parts 2044 of the corresponding stabilizer bars 204. While the keycap 201 of the key 20' is moved downwardly relative to the base plate 21, the first linking parts 2042 and the second linking parts 2044 of the corresponding stabilizer bars 204 are contacted with the first buffering parts 23 and the second buffering parts 24, respectively. Under this circumstance, the first buffering parts 23 and the second buffering parts 24 are used as the fulcrums of the first linking parts 2042 and the second linking parts 2044, respectively.

Figure 11:
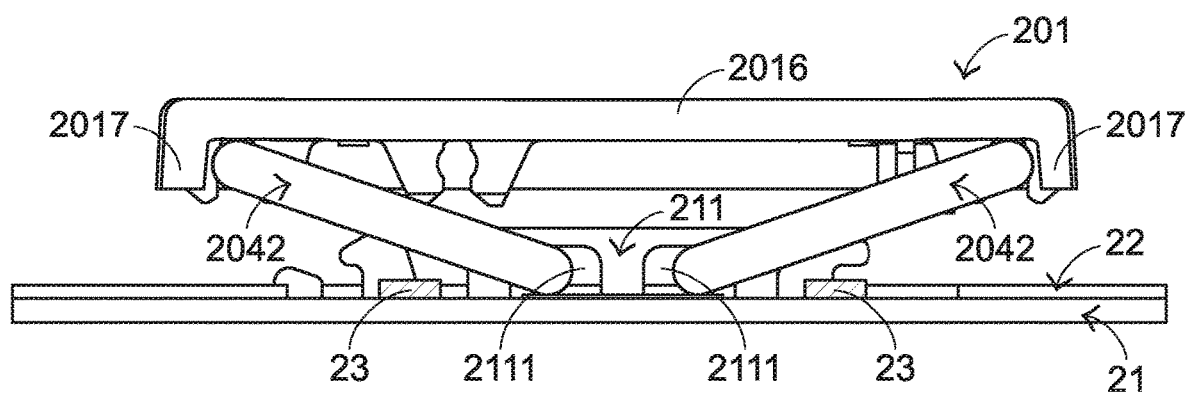
FIG. 11 is a schematic perspective view illustrating a portion of the keyboard device as shown in FIG. 6, in which the keycap of the key is not depressed.
Figure 12:
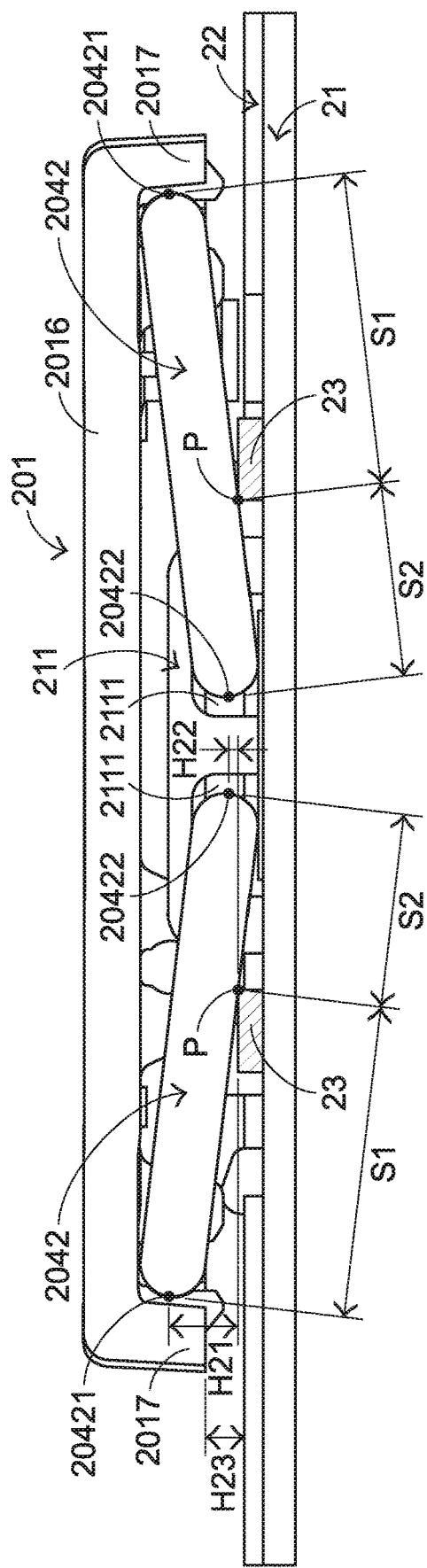
FIG. 12 is a schematic perspective view illustrating a portion of the keyboard device as shown in FIG. 6, in which the keycap of the key is depressed.

Please refer to FIGS. 11 and 12. FIG. 11 is a schematic perspective view illustrating a portion of the keyboard device as shown in FIG. 6, in which the keycap of the key is not depressed. FIG. 12 is a schematic perspective view illustrating a portion of the keyboard device as shown in FIG. 6, in which the keycap of the key is depressed. For succinctness, only the stabilizer bars 204, the first buffering parts 23 and the related components are shown in FIGS. 11 and 12. As shown in FIG. 11, the keycap 201 of the key 20' is not depressed. Meanwhile, the first linking parts 2042 of the stabilizer bars 204 are not contacted with the corresponding first buffering parts 23. As shown in FIG. 12, the keycap 201 of the key 20' is moved downwardly relative to the base plate 21. Meanwhile, the first linking parts 2042 of the stabilizer bars 204 are contacted with the corresponding first buffering parts 23. As shown in the drawing, there is a first contact point P between the first linking part 2042 and the corresponding first buffering part 23. Moreover, there is a first spacing distance 51 between the first contact point P and the first end 20421 of the first linking part 2042, and there is a second spacing distance S2 between the first contact point P and the second end 20422 of the first linking part 2042. Since the first buffering part 23 is only contact with a portion of the first linking part 2042, the first buffering part 23 can be used as a fulcrum. According to the principle of leverage, there is a first vertical distance H21 between the first contact point P and the first end 20421 of the first linking part 2042, and there is a second vertical distance H22 between the first contact point P and the second end 20422 of the first linking part 2042. The first vertical distance H21 is larger than the second vertical distance H22.

As mentioned above, the first end 20421 of the first linking part 2042 is closer to the outer periphery of the keycap 201 than the second end 20422 of the first linking part 2042. Moreover, the skirt part 2017 is protruded downwardly from the edge of the covering body 2016 of the keycap 201. By this design, the gap H23 between the skirt part 2017 and the base plate 21 or the membrane circuit board 22 is larger. Since the base plate 21 or the membrane circuit board 22 is not collided by the skirt part 2017 of the keycap 201, the unpleasing sound is not generated.

In accordance with a feature of the present invention, the first spacing distance 51 between the first contact point P and the first end 20421 of the first linking part 2042 is larger than the second spacing distance S2 between the first contact point P and the second end 20422 of the first linking part 2042. According to the principle of leverage, this design has the following advantages. In case that the first contact point P is closer to the second end 20422 of the first linking part 2042, the gap H23 between the skirt part 2017 and the base plate 21 or the membrane circuit board 22 is larger. Consequently, the efficacy of preventing the skirt part 2017 of the keycap 201 from colliding with the base plate 21 or the membrane circuit board 22 to generate sound will be enhanced.

Similarly, in case that the keycap 201 of the key 20' is not depressed, the second linking parts 2044 of the stabilizer bars 204 are not contacted with the corresponding second buffering parts 24. While the keycap 201 of the key 20' is moved downwardly relative to the base plate 21, the second linking parts 2044 of the stabilizer bars 204 are contacted with the corresponding second buffering parts 24. Similarly, there is a second contact point between the second linking parts 2044 and the corresponding second buffering part 24. There is a spacing distance between the second contact point and the first end of the second linking part 2044. There is another spacing distance between the second contact point and the second end of the second linking part 2044. Since the second buffering part 24 is only contact with a portion of the second linking part 2044, the second buffering part 24 can be used as a fulcrum. As mentioned above, the first end of the second linking part 2044 is closer to the outer periphery of the keycap 201 than the second end of the second linking part 2044. Moreover, the skirt part 2017 is protruded downwardly from the edge of the covering body 2016 of the keycap 201. Similarly, according to the principle of leverage, the gap between the skirt part 2017 and the base plate 21 or the membrane circuit board 22 is larger. Consequently, the efficacy of preventing the skirt part 2017 of the keycap 201 from colliding with the base plate 21 or the membrane circuit board 22 to generate sound will be enhanced.

Similarly, the spacing distance between the second contact point and the first end of the second linking part 2044 is larger than the spacing distance between the second contact point and the second end of the second linking part 2044. According to the principle of leverage, this design has the following advantages. In case that the second contact point P is closer to the second end of the second linking part 2044, the gap between the skirt part 2017 and the base plate 21 or the membrane circuit board 22 is larger. Consequently, the efficacy of preventing the skirt part 2017 of the keycap 201 from colliding with the base plate 21 or the membrane circuit board 22 to generate sound will be enhanced.

As mentioned above, while the keycap 201 of the key 20' is moved downwardly relative to the base plate 21, the first linking parts 2042 and the second linking parts 2044 of the stabilizer bars 204 are contacted with the corresponding first buffering parts 23 and the corresponding second buffering parts 24, respectively. In addition, the first linking parts 2042 and the second linking parts 2044 of the stabilizer bars 204 are pushed against the corresponding first buffering parts 23 and the corresponding second buffering parts 24, respectively. Consequently, the main bar parts 2041 of the stabilizer bars 204 do not collide with the base plate 21 or the membrane circuit board 22 to generate the unpleasing sound.

Preferably but not exclusively, the first buffering parts 23 and the second buffering parts 24 are made of silicone rubber or pressure sensitive adhesive (PSA). Moreover, the first buffering parts 23 and the second buffering parts 24 are formed on the base plate 21 by a screen printing process, a transfer printing process, a dispensing process or an adhesive attaching process.

It is noted that numerous modifications and alterations may be made while retaining the teachings of the invention.

In the above embodiments, the first buffering parts 23 and the second buffering parts 24 are disposed on the base plate 21. Alternatively, the first buffering parts 23 and the second buffering parts 24 are disposed on the membrane circuit board 22.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A keyboard device, comprising: a key comprising a keycap and a stabilizer bar, wherein the stabilizer bar comprises a main bar part, a first linking part and a first insertion part, wherein the main bar part is pivotally coupled to the keycap, a first end of the first linking part is connected with a first end of the main bar part, a second end of the first linking part is connected with a first end of the first insertion part, a junction between the first end of the first linking part and the first end of the main bar part is a first bent structure, and a junction between the second end of the first linking part and the first end of the first insertion part is a second bent structure;
   a base plate, wherein the key is connected with the base plate, and a first connecting structure is protruded upwardly from the base plate, wherein the first connecting structure has a first locking hole, and a second end of the first insertion part of the stabilizer bar is penetrated through the first locking hole;
   a membrane circuit board disposed on the base plate, and comprising a membrane switch corresponding to the key; and
   a buffering part disposed on the base plate or the membrane circuit board and located under the first linking part, wherein while the keycap depressed and the first linking part is correspondingly moved downwardly, the first linking part is contacted with a point of the buffering part, wherein there is a first vertical distance between the point and the first end of the first linking part, there is a second vertical distance between the point and the second end of the first linking part, and the first vertical distance is larger than the second vertical distance, wherein a lowest part of the second end of the first linking part is lower than a highest part of the point of the buffering part.

2. The keyboard device according to claim 1, wherein while the keycap depressed and the first linking part is correspondingly moved downwardly to be contacted with the buffering part, there is a first spacing distance between the point and the first end of the first linking part, and there is a second spacing distance between the point and the second end of the first linking part.

3. The keyboard device according to claim 2, wherein the first spacing distance is larger than the second spacing distance.

4. The keyboard device according to claim 1, wherein the key further comprises a connecting element, wherein the connecting element is connected between the base plate and the keycap, and the keycap is movable upwardly or downwardly relative to the base plate through the connecting element.

5. The keyboard device according to claim 4, wherein the connecting element comprises:
   a first frame, wherein a first end of the first frame is connected with the keycap, and a second end of the first frame is connected with the base plate; and
   a second frame connected with the first frame and swung relative to the first frame, wherein a first end of the second frame is connected with the base plate, and a second end of the second frame is connected with the keycap.

6. The keyboard device according to claim 5, wherein the keycap further comprises a fixed hook and a movable hook, wherein the fixed hook is connected with the first end of the first frame, and the movable hook is connected with the second end of the second frame, so that the second end of the second frame is movable within the movable hook.

7. The keyboard device according to claim 5, wherein the base plate further comprises a first base plate hook and a second base plate hook, which are protruded upwardly from the base plate, wherein the first base plate hook is connected with the first end of the second frame, and the second base plate hook is connected with the second end of the first frame.

8. The keyboard device according to claim 1, wherein the buffering part is formed on the base plate or the membrane circuit board by a screen printing process, a transfer printing process, a dispensing process or an adhesive attaching process.

9. The keyboard device according to claim 1, wherein the buffering part is made of silicone rubber or pressure sensitive adhesive (PSA).

10. The keyboard device according to claim 1, wherein the stabilizer bar comprises a second linking part and a second insertion part, wherein a first end of the second linking part is connected with a second end of the main bar part, a second end of the second linking part is connected with a first end of the second insertion part, a junction between the first end of the second linking part and the second end of the main bar part is a third bent structure, and a junction between the second end of the second linking part and the first end of the second insertion part is a fourth bent structure, wherein a second connecting structure is further protruded upwardly from the base plate, the second connecting structure has a second locking hole, and a second end of the second insertion part of the stabilizer bar is penetrated through the second locking hole.

11. The keyboard device according to claim 1, wherein the key further comprises an elastic element, wherein the elastic element is arranged between the keycap and the membrane circuit board, and comprising a contacting part, wherein while the keycap is depressed, the elastic element is compressed by the keycap and the membrane switch is pushed by the contacting part, wherein when the keycap is not depressed, the keycap is returned to an original position in response to an elastic force provided by the elastic element.

12. The keyboard device according to claim 1, wherein the membrane circuit board further comprises an upper film layer and a lower film layer, wherein a first circuit pattern is formed on the upper film layer, a second circuit pattern is formed on the lower film layer, the first circuit pattern comprises an upper contact, and the second circuit pattern comprises a lower contact, wherein the upper contact and the lower contact are separated from each other by a spacing distance and collectively defined as the membrane switch.

* * * * *